United States Patent

[11] 3,530,774

| [72] | Inventors | Shirley H. Booth,<br>Franklin;<br>John G. Lepiston, Middletown, Ohio |
|---|---|---|
| [21] | Appl. No. | 755,480 |
| [22] | Filed | July 2, 1968<br>Devision of Ser. No. 690,230,<br>Dec. 13, 1967, now Pat. No.<br>3,412,925, Nov. 26, 1969,<br>which is a continuation-in-part<br>of Ser. No. 548,593, May 5, 1966,<br>abandoned |
| [45] | Patented | Sept. 29, 1970 |
| [73] | Assignee | By mesne assignments, to<br>Hoerner Waldorf Corporation,<br>St. Paul, Minn., a<br>corporation of Delaware |

[54] METHOD OF MAKING A FLAT BOTTOM MULTI-PLY BAG
4 Claims, 9 Drawing Figs.

[52] U.S. Cl. ........................ 93/35,
93/8, 93/20, 229/62.5
[51] Int. Cl. ........................ B31b 49/04
[50] Field of Search ........................ 229/62.5,
68; 93/8, 8(Valve Bags Digest),
35(Rectangular Bags Digest), 35

[56] References Cited
UNITED STATES PATENTS

| 3,306,522 | 3/1966 | Honsel .................... | 229/55 |
| 3,366,018 | 1/1968 | Civitello .................. | 93/35X |

*Primary Examiner*—Bernard Stickney
*Attorney*—Donald L. Johnson

ABSTRACT: A multiwall bag having an inner, a second, and a third ply of tubular, concentrically arranged material wherein the inner ply is made from a preformed, tubular thermoplastic material. Both the inner plastic ply and the second or next innermost ply have the same length and initially have straight cut end sections. The bag has a diamond fold closure on at least one end provided by two infolded corner tabs and two infolded side flaps wherein one of the side flaps has one portion of a greater length than the other to provide a stepped-end seal when the side flaps are infolded. The diamond fold end closure is made by adhesively joining the side flaps to each other and to the corner flaps without permanently adhesively joining the interior surface of the inner plastic ply either to itself or to any other surface of the second or third plies of material. The bag thus constructed has the advantages that the interior plastic ply substantially covers the inside of the bag whereby materials which would normally damage kraft paper can be conveniently packaged without damage. The bag can be produced on high speed multiwall bag tubing and flat bottom bag bottoming equipment without any sacrifice in speeds since the bag does not require a hermetic or a permanent adhesive end seal for the plastic inner ply. A process for the manufacture of the bag is also disclosed.

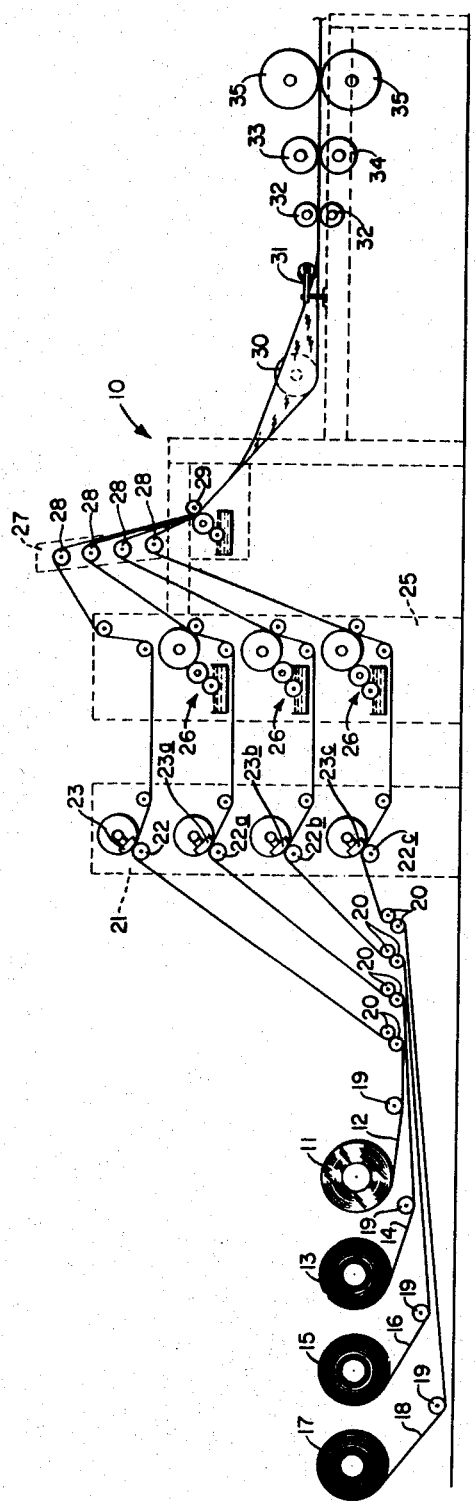

Patented Sept. 29, 1970
3,530,774
Sheet 2 of 4
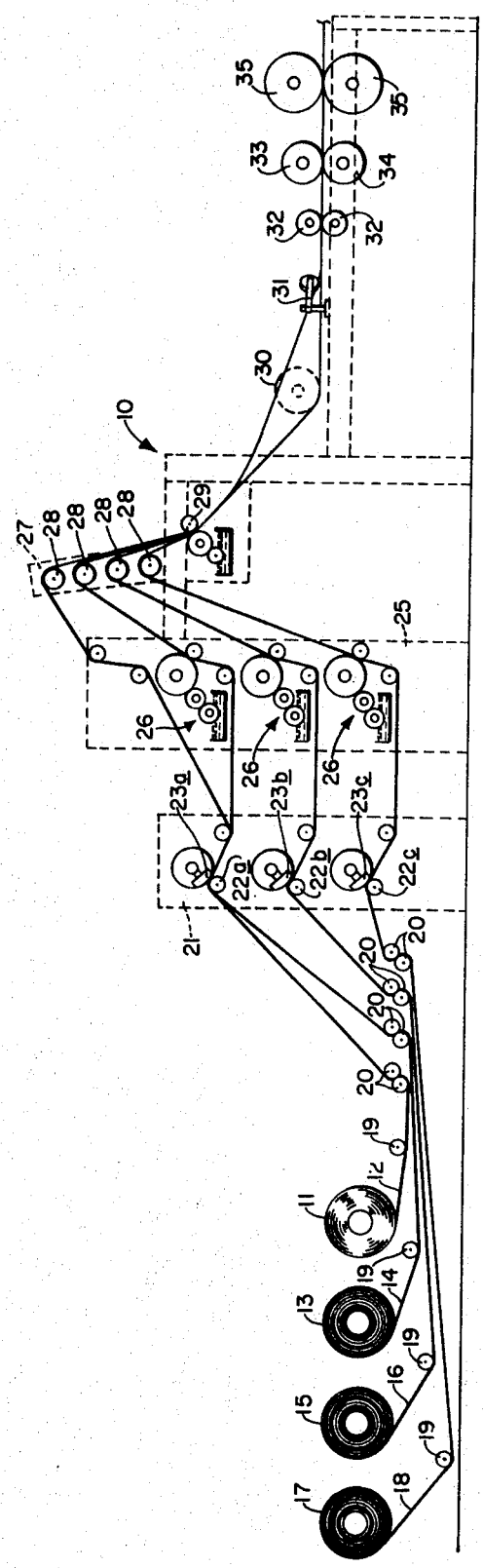
FIG. IA.
INVENTORS
SHIRLEY H. BOOTH
JOHN G. LEPISTO
ATTORNEY Patented Sept. 29, 1970

INVENTORS
SHIRLEY H. BOOTH
JOHN G. LEPISTO

ATTORNEY

Patented Sept. 29, 1970 3,530,774

INVENTORS
SHIRLEY H. BOOTH
JOHN G. LEPISTO

ATTORNEY

METHOD OF MAKING A FLAT BOTTOM MULTI-PLY BAG

This application is a division of Ser. No. 690,230, Dec. 13, 1967, now U.S. Pat. No. 3,412,925, issued Nov. 26, 1969, which is a continuation-in-part of copending patent application Ser. No. 548,583, filed May 5, 1966, now abandoned, for "Flat Bottom Multi-ply Bag and Its Manufacture."

This invention relates to multi-ply pasted stepped-end bags and more particularly to bags having an inner ply composed of thermoplastic material.

Multi-ply pasted end bags have an advantage in that their flat bottom permits the ready attachment of a flattened tubular valve for filling the bag. Stepped-end multiwall bags commonly use a "diamond fold" in each end of the bag. This permits the opposite side flaps on each end of the bag to be overlapped to provide a wide glue seam for each ply without thickening the ends of the bag. Exemplary multi-ply pasted end bags are shown in U.S. Pat. Nos. 2,460,885 and 2,460,886. This type bag is normally formed on a bag bottomer machine, for example, a machine of the type shown in U.S. Pat. No. 2,570,047. In normal operation, a multi-ply bag bottoming machine will produce as many as one hundred fifty pasted end multiwall bags per minute. The number of plies and the size of the bag determines to some extent the production rate of the bag.

Bag lengths have been made on a tuber for subsequent conversion by a bottomer machine to multi-ply stepped-end pasted bags by using a sheet of thermoplastic material either laminated to a kraft paper ply or affixed to the surface of the kraft at a multiplicity of spots by an adhesive to form the inner bag ply. This permits the inner ply to be handled with the strength and rigidity of the kraft paper. However, bags of this type require that a longitudinal seam be provided in the thermoplastic inner liner. This seam is usually made by applying a band of synthetic resin adhesive, preferably of the hot melt type. The seal often can be imperfect and causes a loss in the ability of the bag to resist moisture transmission. In the production of a bag having an impervious inner ply made by longitudinally seaming a flat web of thermoplastic material such as polyethylene which has been laminated to a paper backing, it is difficult to obtain a high production rate in forming the bag lengths on a tubing machine because of the necessity of gluing or heat sealing the longitudinal seam and also because the plastic material scores on the former blade at high speeds. The longitudinal seam also provides a weak point in the completed bag since in drop tests bags of this type are shown to fail primarily at this seam.

In French Pat. No. 1,292,332, a stepped-end multi-ply bag is disclosed which has a thermoplastic inner liner or envelope which is preformed prior to enclosure by the paper webs. The inner liner is made by longitudinally seaming the edge of two abutting sheets of thermoplastic material. The bag in this patent is shown as having a lapped interior seal for the thermoplastic inner ply.

Various techniques for providing a hermetic seal in the ends of a thermoplastic inner lined pasted end bag are shown in U.S. Pat. Nos. 2,353,402, 2,537,462, 2,709,549, and 3,199,767. While these patents deal with the formation of hermetic seals in the bottom of the so-called "automatic" opening bags, the problems encountered are also present when providing a hermetic seal in a themoplastic, inner lined, stepped-end bag.

Often it is desired to provide the advantages of a multi-ply thermoplastic inner lined pasted stepped-end bag without the necessity of having a heat seal provided in each end of the thermoplastic inner liner. It has been found that such a bag can be made on a conventional bottoming machine from a bag length or blank produced on a forming machine by running a preformed seamless tube of thermoplastic material, such as polyethylene, inside a plurality of tubed paper webs and attaching the plastic tube to the innermost paper ply by means of spots of adhesive at the upper and lower ends thereof. This provides a multiwall stepped-end pasted bag which has a seamless, tubular thermoplastic inner liner that covers substantially the complete interior surface of the bag and does not leave any significant amount of the kraft paper plies exposed to the contents of the bag. The use of a seamless, tubular, thermoplastic inner liner made from a material such as polyethylene provides an increased strength advantage to the stepped-end pasted multiwall bag. Additionally, the bags of the present invention provide an advantage in that they do not allow the interior of the bag to become contaminated with wood fiber particles and dust, dirt, and other foreign matter which is often trapped on the inside of a thermoplastic-lined bag prepared by forming the inner ply from a flat sheet of laminated thermoplastic material on a bag-tubing machine. Bags of the present invention are particularly advantageous in that they provide substantially complete coverage of the outer paper plies and consequently can be used to package highly acid or alkaline materials such as high phosphate type fertilizers or sodium hydroxide pellets. Additionally, the bags of the present invention have the advantage in that they may be produced on conventional bag bottomers at very high speeds without any sacrifice in quality. The bag of the present invention has the advantage in that it may be made from polyethylene which has been treated to render it adhesively receptive only on the exterior surface thereof. This is due to the fact that the bag of the present invention does not require permanent adhesive attachment of the inner surface of the thermoplastic tubular material either to itself or to any of the paper plies of the bag. Thus, no treatment of the interior surface of the tubular plastic material is required to render this surface receptive to adhesive attachment to any other surface. Heretofore, it has been preferred to use heat sealing techniques for joining the interior surfaces of any seamless, tubular polyethylene material due to the fact that it is impractical to treat the interior surfaces of a seamless tube of polyethylene with a corona electrical discharge to render the surface receptive to adhesives. If it has been necessary to adhesively attach the inner surface of a thermoplastic material to itself or to other materials in the construction of a multiwall bag, it has been preferred to use a flat web of thermoplastic material which had been corona treated on each surface thereof to enhance its receptivity to adhesives. As stated hereinbefore, bags utilizing flat webs of thermoplastic material to form a tubular inner liner by means of a longitudinal seam inherently provide a point of weakness in the longitudinal seam.

It is an object of the present invention to provide a pasted, stepped-end multiwall bag having as its inner ply an inner liner of a preformed, tubular thermoplastic material which bag can be formed at high speeds on conventional tubing and bag-bottoming machines.

It is also an object of the present invention to provide a pasted, stepped-end multiwall bag having a thermoplastic inner liner which does not require the permanent adhesion or heat sealing of the inner liner to itself at either end of the bag.

It is a further object of the present invention to provide a pasted, stepped-end multiwall bag which provides a contamination-free interior surface for the packaging of material requiring extreme cleanliness.

It is an additional object of the present invention to provide a pasted, stepped-end multiwall bag which has a preformed, tubular thermoplastic inner ply covering substantially the entire surface area of the interior of the bag to provide a container for highly corrosive materials.

The foregoing and other objects of the invention as may appear hereinafter are realized in one aspect in a multiwall bag having at least an inner, a second and a third ply of tubular, concentrically arranged material wherein the inner ply is made of a preformed, tubular thermoplastic material. The inner ply and the second ply have substantially the same length and initially have straight transverse cut ends. The bag has a closure in at least one end which is formed by a diamond fold including two infolded corner tabs and two infolded side flaps overlying the corner tabs. One of the side flaps has a third ply portion of greater length than the other side flap to provide a stepped-end seal between the infolded side flaps. The end closure of the bag is effected by adhesively joining the side flaps to each other and to the corner tabs without permanently adhesively joining the interior surface of the inner ply to itself or to any surface of the second or third plies.

The method aspects of the present invention may be carried out in the combination of steps comprising advancing at least a first and a second web of flexible, flat sheet material together with a flattened, preformed, tube of flexible, thermoplastic material. The first web and the flattened, preformed tube of thermoplastic material are perforated transversely in a straight line at equal longitudinally spaced positions to define a bag length. The second web is transversely perforated separately in a stepped pattern to provide a bag length having its minimum length substantially equal to the length of the bag length defined by the perforations in the first web and in the preformed tube. Adhesive is applied along a line substantially parallel to and adjacent either side of the line of perforations in the first and the second webs. The preformed tube is superimposed so that the lines of perforation are in registry with the lines of perforation in the first web. The webs are then infolded around the preformed tube. The bag lengths are separated along the lines of perforation provided therein. A diamond fold is made in at least one end of the bag length to provide corner tabs and side flaps. A pattern of adhesive is applied to the corner tabs and side flaps such that upon infolding the side flaps they are joined to each other and to the corner tabs without permanently joining the interior surface of the preformed tube to itself or to any surface of the first or second ply of the bag.

Other objects, advantages and features of the invention will be apparent from a reading of the following description when taken in conjunction with the accompanying drawings wherein:

FIG. 1 is a schematic elevational view of an exemplary multiwall bag tubing apparatus for carrying out the process to produce the bag lengths from which the multiwall, pasted stepped-end bags of the present invention are made;

FIG. 1A is a view similar to FIG. 1 showing an alternate embodiment of the exemplary multiwall bag tubing apparatus;

Figure 2:
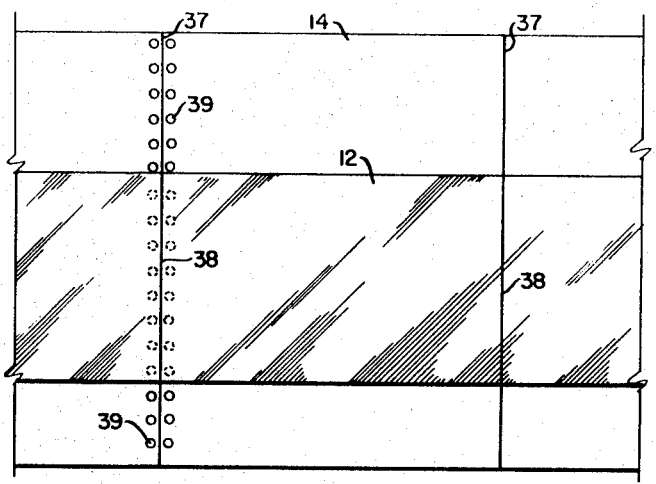
FIG. 2 is a plan view of the preformed, tubular, thermoplastic inner liner superimposed upon the first paper web showing the lines of perforations and the lines of glue spots.

Referring now to FIG. 1, the bag-tubing apparatus or "tuber", designated generally by the numeral 10, may be any one of a number of standard commercial models of tubing machines available. A roll 11 of preformed, tubular, thermoplastic material is provided from which the tubular inner ply 12 of the bag is drawn. The inner ply 12 is preferably a seamless plastic tube, but may be made by heat sealing a flat web of plastic longitudinally to produce a preformed, tubular inner ply. A second roll 13 is provided from which is drawn the material for the second web that is used to make the second ply 14 of the bag. A third roll 15 is provided which supplies the material for the third web to make the third ply 16. A fourth roll 17 is provided which supplies the material for the fourth web that is used to make the fourth ply 18 of the multiwall bag. Each of the rolls 11, 13, 15 and 17 are supported by roll stands (not shown) conventionally used in bag-tubing machines. Each web passes under a take-off roller 19 and then through edge alignment rollers 20–20. The length of preformed, tubular thermoplastic material from which inner ply 12 is made enters the top of the perforating stand 21 where it passes over support roller 22 and is transversely perforated at longitudinally spaced intervals by a rotating knife 23. The second, third and fourth webs 14, 16 and 18 pass over support rollers 22a, 22b, and 22c respectively and are transversely perforated by rotating knives 23a, 23b, and 23c respectively. The second, third and fourth webs 14, 16, and 18 next pass into the spot paster stand 25 where spot paster applicator units, designated generally by numeral 26, apply a transverse line of spots of adhesive on both sides of the line of perforations produced in the webs by the knives 23a, 23b, and 23c. The tubular, inner ply of thermoplastic material 12 does not receive any spots of adhesive on its exterior surface. The webs 14, 16, and 18 and the tubular, inner ply of thermoplastic material 12 next pass into the head stand 27 and over individual head rollers 28. The various ply materials are then superimposed and passed through the seam adhesive unit 29 where a longitudinal ban of adhesive is applied to either the right hand edge or the left hand edge of each of the plies of material 14, 16, and 18. The superimposed plies then pass under the heel roller 30 and the paper plies are infolded by conventional drags and rollers (not shown) to infold the paper plies about the preformed thermoplastic, tubular, inner ply. A series of forming rolls 31, only one of which is shown, push the overlap plies together to form them loosely around the flattened, inner ply. A pair of ironing blades (not shown) makes the final fold to form the paper plies about the flattened, inner ply. A pair of smoothing rollers 32–32 press the paper plies into a flattened tube before they pass into the nip of upper draw roller 33 and the lower draw roller 34. The concentrically arranged tubes next pass into the nip of separating rollers 35–35 whose circumference is greater than the upper and lower draw rollers 33–34, whereby the longitudinally extending tube is separated along the lines of perforations in each of the webs into discrete bag lengths, designated generally by the numeral 36, as may be seen in FIG. 3.

Referring now to FIG. 1A an alternative form of tuber set-up is utilized to produce the multiwall bag of the present invention. The tuber set-up is substantially the same as described above with reference to FIG. 1 except that the tubular thermoplastic inner ply 12 does not pass over support roller 22 for separate perforation by knife 23. As seen the tubular, inner ply 12 is superimposed on the second web 14 as it passes over support roller 22a where it is simultaneously perforated by the rotating knife 23a as it perforates the second web 14. After passing through the perforating stand 21 the tubular inner ply is separated from second web 14 so that web 14 can be passed through one of the spot paster applicator units 25 to affix a line of adhesive spots 39 across the second ply as seen in FIG. 2. This process for manufacture of the multiwall bags is the presently preferred process since it provides assurance that the tubular, inner ply 12 and the second ply 14 will be perforated on exactly the same transverse line to produce a bag wherein the lengths of these components will be substantially the same. Additionally the second paper web 14 provides support for the tubular, inner ply 12 of thermoplastic material as it passes through the perforating stand 21.

Figure 3:
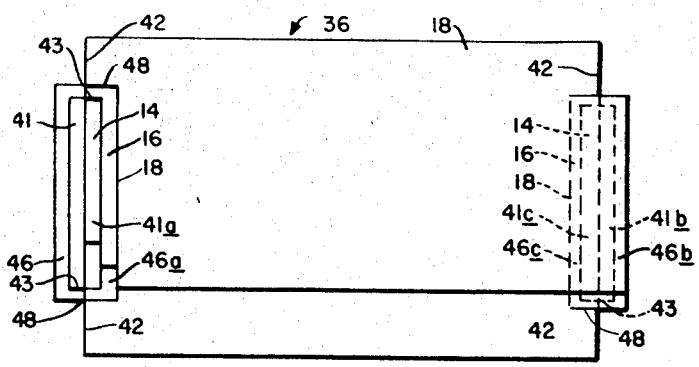
FIG. 3 is a plan view of a single bag length of the present invention as it is produced by the exemplary apparatus of FIG. 1.

As seen in FIG. 2, the second web of material 14 is divided into discrete bag lengths by a line of perforations 37 which are placed transverse to the length of the web 14 at evenly spaced intervals. The tubular inner ply of thermoplastic material 12 is also perforated by a line of perforations 38 which correspond to the longitudinal spacing of the perforations 37–37 which divide the web 14 into bag lengths. Thus, the second ply web 14 and the thermoplastic inner liner 12 are of equal length and each have a straight transverse line of perforations at their respective ends which permit the web 14 and the liner 12 to be separated into discrete bag lengths 36, as seen in FIG. 3. A line of adhesive spots 39 are provided adjacent either side of the line of perforations 37 in the second web whereby the second web 14 is attached to the exterior surface of the thermoplastic inner ply 12 at each end thereof. While only the left hand line of perforations 37 is shown as having adhesive spots 39 at each side thereof, it will be understood that the right hand line of perforations 37 will also have a line of adhesive spots similar to that shown for the left hand line of perforations.

Figure 2A:
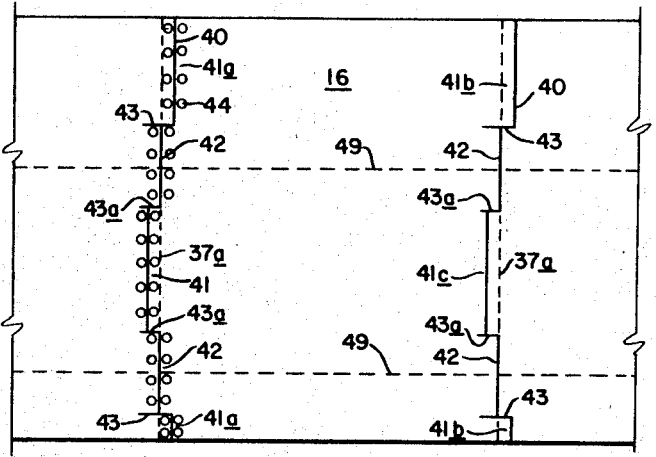
FIG. 2A is a plan view of the second paper ply showing the lines of perforations and the lines of glue spots.

Referring now to FIG. 2A, the third web of material 16 is provided with longitudinally spaced apart lines of perforations 40–40 which divide this web into discrete bag lengths. The line of perforations 40 is not a straight transverse line as is the line of perforations 37 in web 14. While the line of perforations 40 extends across the width of web 14, portions of the line are offset from other portions at each end of the bag length necessary for the pasted, stepped-end construction of the bag. Two pairs of spaced apart longitudinal cuts 43–43 and 43a–43a join the various offset portions of the line of perforations 40. That portion of the left hand line of perforations 40 lying between transverse cuts 43a–43a is to the left of the dotted line 37a and defines an outwardly projecting side flap portion 41 of the third ply 16. Line 37a indicates the position of line 37 in web 14 when it is superimposed on web 16. The portion of the left hand line of perforations 40 lying between cuts 43a–43 on each side flap portion 41 defines the end or corner flap portions 42–42 of web 16. This portion of the line of perforations 40 coincides with line 37a so that the end flap portions 42 of web 16 have the same length as web 14. The portions of the left hand line of perforations 40 lying between each of the cuts 43 and the edge of web 16 define a stepped-in side section 41a which is the same length as the section of line 40 between cuts 43a–43a when the web 16 is folded into a tube and longitudinally seamed.

The right hand line of perforations 40 has the same pattern and dimensions as does the left hand line of perforations. Longitudinal cuts 43 and 43a join the offset portions of the line of perforations 40. At the right hand end of web 16 the portions of line 40 lying between cuts 43 and the respective side edges of web 16 define an outwardly projecting side flap portion 41b when they are joined together by folding web 16 into a tube. The portion of line 40 between cuts 43a–43a is to the left of line 37a and defines a stepped-in side section 41c. The side section 41c is the same length as is the section 41b between cuts 43–43 when the web 16 is folded into a tube and longitudinally seamed. The portion of the right hand line of perforations 40 lying between cuts 43a–43a on each side of stepped-in side section 41c defines corner or end flap portions 42–42 having the same configuration as do the corner flap portions at the left hand end of web 16.

Figure 2B:
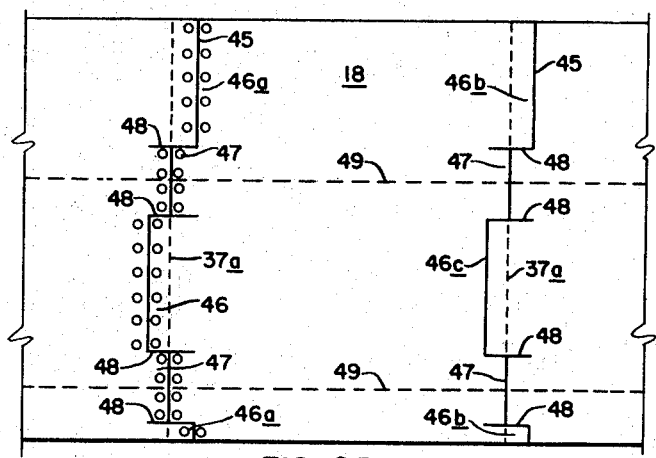
FIG. 2B is a plan view of the third paper web showing the lines of perforations and the lines of glue spots.

Referring now to FIG. 2B, the fourth web of material 18 is perforated by a line of perforations 45 in a series of offset straight line segments to provide side flap portions 46 and 46b. End or corner flap portions 47–47 are provided for each end of the bag which coincide with line 37a so that all paper plies 14, 16, 18 and the plastic tube 12 have end flap portions of equal length in this embodiment of the bag of the present invention. Longitudinal cuts 48 are provided in the fourth web 18 to which are joined the offset segments of the line of perforations 45. Stepped-in side sections 46a and 46c are provided at the left and right hand end respectively of the web 16 corresponding in depth to the height of opposite side flaps 46b and 46. As seen in FIGS. 2A and 2B, the spaced-apart dotted lines 49–49 show the position of the tubular, thermoplastic inner liner 12 when webs 14, 16, and 18 are superimposed and are then folded about thermoplastic inner liner 12.

While the preferred embodiment of the multiwall bag of the present invention is made as described above with all plies having straight or flush cut corner or end flap portions 42 it is understood that the bag can be made with the end flap portion of one or more webs cut in a pattern similar to that shown for the side flaps to provide a stepped corner construction for the bag of the invention. Exemplary construction for incorporating stepped corners or ends in the bags of the present invention is disclosed in U.S. Pat. Nos. 2,729,150 and 2,810,509. Other arrangements for stepped corner or end construction can also be used.

As described hereinbefore with reference to FIG. 1, the tubular inner ply of plastic material 12, the second web of material 14, the third web of material 16 and the fourth web of material 18 are superimposed and folded about thermoplastic tube 12 to form a longitudinally continuous group of inner connected bags. The connected-together bags are separated by the separating rollers 35–35, stacked and then transported to the bag bottoming machine. Prior to being fed to the bottomer, the bag length, designated generally by the numeral 36, has the form shown in FIG. 3. The bag contains a length of the tubular, thermoplastic inner ply 12 which cannot be seen because the second ply of material 14 has straight cut ends and is substantially equal in length to ply 12 so that it covers the ends of the transverse straight cut in the thermoplastic ply 12. It is a feature of the bag of the present invention that the second ply of material 14 is not provided with either a stepped-in portion or a side flap portion at the ends thereof as are the third ply of material 16 and the fourth ply of material 18. The left hand end of the third ply 16 of the bag 36 has an outwardly extending side flap portion 41 on the bottom wall of the bag and a complementary stepped-in area 41c in the top wall of the bag. The left hand end of the fourth ply 18 has an outwardly extending side flap portion 46 in the bottom wall of the bag and a complementary stepped-in area 46a in the top wall of the bag. The right end of the bag has a stepped-in and side flap portion arrangement which is the reverse image of that shown at the left hand end of the bag 36. Each pair of transverse cuts 43–43 in the ply 16 and each pair of transverse cuts 48–48 in ply 18 are now superimposed since the bag web has been folded into a tube. The transverse cuts 43 and 48 may be omitted if desired, however, this shortens the overlap of the side flaps over the end or corner flaps which may decrease the strength of the bag at each end.

Figure 3A:
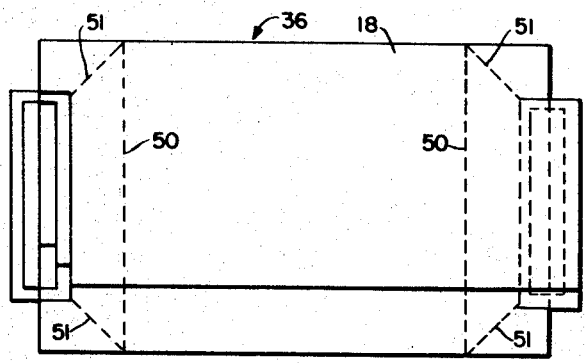
FIG. 3A is a plan view of the bag length of FIG. 3 showing in dotted outline the crease lines made by a conventional bag-bottoming machine in forming the diamond fold pattern for the bottom of the bag.

Referring now to FIG. 3A, the dotted transverse line 50 adjacent each end of the bag is the score line along which the side flap portions of the bag are folded back when making the diamond fold in the bag. Diagonal score lines 51 at each side of the bag are the lines along which the end or corner flaps 42 of the bag are infolded when making the diamond fold.

Figure 3B:
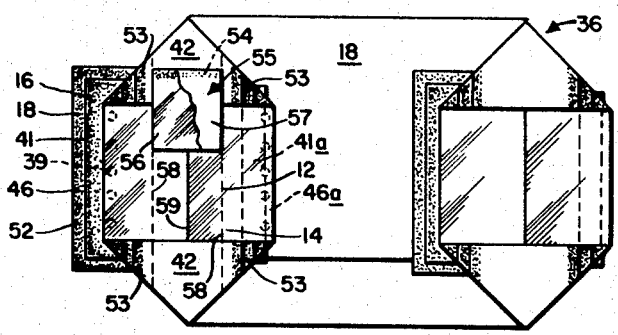
FIG. 3B is a plan view similar to FIG. 3A showing the bag ends folded along the crease lines to provide the diamond fold for each end of the bag.

Referring now to FIG. 3B, after the diamond fold is made in the bag, the bag ends have the position as shown. The superimposed diagonal cut lines 43 and 48 (as seen in FIG. 3) permit the side flap portions of the webs to be infolded past the outer side edges of the side flap portions of the webs. Adhesive 52 is applied to side flap portions 41 and 46 of second ply 16 and third ply 18 respectively. Additionally, adhesive 52 is applied to a corner area 53 in each corner of the infolded end flaps of the various plies. The thermoplastic tubular inner ply 12 is adhesively attached to the second ply of material 14 by means of dots of adhesive 39 and thus covers the portion of second ply 16 which can be seen in the rectangular open portion of the diamond fold in FIG. 3B. A line of adhesive 54 on the top end flap extends between two spaced-apart areas covered by adhesive 53–53. The valve for the bag, designated generally 55, is attached to one end flap by means of this line of adhesive 54. The valve 55 is made from a short length of tubular plastic material 56 and a small rectangular piece of paper 57 which is adhesively attached to the top side of tube 56.

Figure 3C:
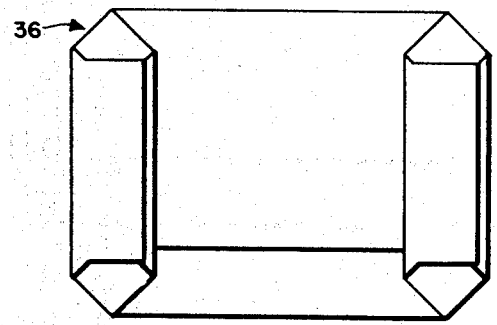
FIG. 3C is a plan view of the completed bag provided by infolding the side flaps of the bag shown in FIG. 3B and adhesively attaching them in the pattern shown in FIG. 3B.

The right hand side of the side flap portion of the bag 36 is infolded along the line 58 parallel to the edge of one side of valve 55 thereby to turn up the stepped-in side areas 41a and 46a. When the right hand stepped-in area of the diamond fold is folded along line 58, the straight cut bottom portion of inner ply 12 and equal length adjacent bottom portion of second ply 16 extend slightly over the line 59 formed by the abutting interior faces of the flattened inner ply 12. The adhesive covered area 53 on the top of the right hand flap of the bag bottom is then attached to the paper 57 on the top surface of valve and the other adhesive covered area 53 at the bottom of the right hand flap is attached to a triangular area of the lower end flap 42. Next, the left hand side flap of the diamond fold is folded over along the line 58 thereby placing side flap 41 on top of stepped-in side section 41a, and placing side flap 46 on top of stepped-in side section 46a of their respective plies. The straight cut coinciding edges of inner ply 12 and second ply 16 are lapped slightly over the corresponding edges of the right hand side flap. There is no permanent adhesive attachment made between the narrow band of the plastic inner ply 12 and the abutting area of the top of section ply 16. However, often the paste applicators on the bottomer machine when applying the adhesive to the left hand side flap will coat a portion of the adjacent area of the inside surface of the plastic inner ply 12. Since the normally used adhesives are casein based they will not permanently attach the inner surface of the plastic ply 12 to the top of the lapped over portion of the second ply 16. The seal is temporary and is so weak that it will normally be broken by the flexing the bag undergoes when being filled. The lapover is provided to insure that the interior surface of the bag is covered by the plastic inner ply and that there is substantially no direct exposure of any of the paper plies to contents of the bag when it is filled. Thus, the left hand end of the bag is adhesively sealed over all the contacting surfaces, except for the interior abutting faces of valve 55. It will be understood that the right hand end of the bag is closed in a similar manner except that no valve is provided in this end. The finished bag 36 is seen in FIG. 3C.

Exemplary bags constructed in accordance with the present invention were made for packaging 50 pounds of triple superphosphate fertilizer (0–46–0). The bags were made using three plies of 50 pound brown kraft paper and an inner ply of seamless, low-density polyethylene tubing have a wall thickness of 1.5 mils. Referring to FIG. 3 of the drawings, the bag length had a length of 26½" and a width of 15". Side flap 46 was 1¾" wide and 9" long, side flap 41 was 1" wide and 8" long, stepped-in areas 46a and 41a corresponded in dimensions to that of flap 46 and flap 41 respectively. Transverse cuts 48–48 were 2½" in length, and cuts 43–43 were 2¼" in length. Referring now to FIG. 3A, score line 50 was 5½" from the end of the bag (as measured at the edge of the end flap 42), and diagonal line 51 was 8" long as measured from the edge of plies 12 and 14. This provided a diamond fold wherein the right hand side flap (as seen in FIG. 3B) was folded back on a line 58 that was 3" back from the matched edges of plies 12 and 14. When folded on this line the flap had a ¼" lap over the center line 59. The left hand flap had a height of 4½" when folded on line 58 and provided a ¾" lap of the polyethylene inner liner over on the top of ply 16 (i.e. in stepped area 41a).

By utilizing the process of the present invention, it is possible to produce the multiwall bags of this invention on a tubing machine at rates as high as 150 per minute. Multiwall bags made by longitudinally seaming plastic coated or laminated paper with either heat or an adhesive cannot be produced at rates anywhere close to the rate for the bag of this invention. Additionally, the bag lengths can be converted into finished bags on conventional bottoming machines at a rate of from about 70 to 120 bags per minute depending on the size of the bag lengths. This is the same rate of production that can be attained when producing multiwall bags without any plastic inner liner. Substantially lower production rates are attained when it is necessary to heat-seal the ends of the bag. One form of apparatus and process for heat-sealing the ends of a bag with a thermoplastic inner liner is described in U.S. Pat. No. 3,199,767.

The bag of the present invention has a much lower moisture vapor transmission rate than does an unlined multiwall bag. In fact, the MVTR of the present bag approaches that of a plastic inner lined bag having heat-sealed end closures.

It is understood that the process and product of the present invention described herein are subject to wide modifications without departing from the spirit of the invention. For example, while polyethylene has been described as a thermoplastic inner liner material, other plastics may be used such as polypropylene, polyvinyl chloride, saran, cellophane, and others. While paper is the described material for use in making the other plies of the bag, it is understood that other material can be used, e.g. additional plies of plastic material can be used. While the illustrated bag has only three plies of paper, it is clear that the bag can be constructed with two or more plies of paper. Other modifications will be apparent to those skilled in the bag-making art. Therefore, the specific process and bag described herein are merely illustrative and are not to be considered as limiting the scope of the following claims.

We claim:

1. In the manufacture of pasted end multiwall bags the combination of steps comprising:
    a. advancing at least a first and a second web of flexible flat sheet material together with a flattened, preformed tube of flexible thermoplastic material;
    b. perforating transversely in a straight line said first web and said flattened, preformed tube at longitudinally spaced positions to define a bag length;
    c. separately perforating said second web transversely in a stepped pattern to provide a bag length having its minimum length substantially equal to the length of said bag length defined by the perforations in said first web and said preformed tube;
    d. applying adhesive along a line substantially parallel to and adjacent either side of the line of perforations in said first web;
    e. superposing said preformed tube, so that said lines of perforation are in register with the line of perforations in said first web and infolding said webs around said tube; and
    f. separating said bag lengths along the line of perforations provided therein.

2. In the method defined in claim 1 the additional steps comprising:
    a. making a diamond fold in at least one end of said bag length to provide corner tabs and side flaps;
    b. applying a pattern of adhesive to said corner tabs and side flaps such that upon infolding said side flaps they are joined to each other and to said corner tabs without permanently joining the interior surface of said preformed tube to itself or to any surface of the first or second ply of said bag.

3. The method defined in claim 1 wherein in step b; said first web and said flattened, preformed tube are separately perforated.

4. The method defined in claim 1 wherein in step e; said lines of perforation in said tube are also in register with at least a portion of the line of perforations in at least one of the other webs.